(12) United States Patent
Shohara et al.

(10) Patent No.: US 6,463,659 B2
(45) Date of Patent: *Oct. 15, 2002

(54) MULTI-STAGE PULLEY AND PRODUCTION METHOD THEREOF

(75) Inventors: Hiroshi Shohara; Mitsunori Adachi, both of Toyohashi; Haruo Suzuki, Aichi; Yasuji Kasuya, Okazaki; Tetuo Ohno, Oobu; Yasuo Tabuchi, Toyoake; Masahiro Kinoshita, Kariya, all of (JP)

(73) Assignee: Denso Corporation, Kariya (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/273,712

(22) Filed: Mar. 22, 1999

(65) Prior Publication Data

US 2001/0052184 A1 Dec. 20, 2001

(30) Foreign Application Priority Data

Mar. 23, 1998 (JP) .......................................... 10-074495

(51) Int. Cl.[7] .............................................. B23P 17/00
(52) U.S. Cl. ...................................... 29/892.3; 474/171
(58) Field of Search ................................ 29/892, 892.3; 474/158–160, 170, 171, 902

(56) References Cited

U.S. PATENT DOCUMENTS 5,727,411 A * 3/1998 Sakakibara et al. ........... 72/110

FOREIGN PATENT DOCUMENTS

| EP | 0552776 A1 | * 7/1993 | |
| JP | 63-63544 | 3/1988 | |
| JP | 63246566 | * 10/1988 | .............. 474/170 |
| JP | 2-121739 | * 5/1990 | .............. 29/892.3 |

* cited by examiner

Primary Examiner—P. W. Echols
(74) Attorney, Agent, or Firm—Pillsbury Winthrop LLP

(57) ABSTRACT

An annular groove portion is formed between portions corresponding to groove portions and thereafter the groove portions are formed while the annular groove is pressed. Consequently, since the stress produced due to a plastic deformation in forming the groove portions can be absorbed by the annular groove having a smaller rigidity than the groove portions, no undesirable plastic deformation of the groove portions occurs and hence the accuracy of the finished size of the multi-stage pulley can be improved. Furthermore, the capital investment in groove forming rollers can be reduced and the manufacturing cost of the multi-stage pulley can be reduced.

5 Claims, 10 Drawing Sheets

DEFORMATION
207
THE ANGLE OF THE
V-GROOVE IS
CHANGED

DEFORMATION
207
AN ANNULAR GROOVE
IS DEFORMED 104a
104

MULTI-STAGE PULLEY AND PRODUCTION METHOD THEREOF

BACKGROUND OF THE INVENTION

1. Field of the Invention

The present invention relates to a multi-stage pulley having a plurality of groove portions around which driving belts can be wound and to a method for producing the same.

2. Description of the Related Art

In a known method for producing a multi-stage pulley, disclosed in, for example, Kokai (Jpn. Unexamined Patent Publication) No. 63-63544, groove portions are formed by a plastic deformation of a workpiece(a blank for a multi-stage pulley), using a groove forming roller which is provided with a plurality of groove forming portions, integral therewith, which are coaxially arranged.

Since each groove portion is formed by a plastic deformation of the blank for a multi-stage pulley using the groove forming roller, the groove forming roller is subjected to a shearing stress at its front end due to the plastic deformation. Thus, in the known apparatus described in the above-mentioned publication, there is a high probability that the groove forming roller is damaged during the formation of the grooves.

Furthermore, in the known apparatus described in the above-mentioned publication, if only one of the groove forming portions is damaged, the entirety of the groove forming roller must be replaced, because the groove forming portions are formed integratedly. Therefore, the known apparatus described in the above-mentioned publication has a problem in that as the cost of the groove forming roller increases, the manufacturing cost of the multi-stage pulley increases.

SUMMARY OF THE INVENTION

In consideration of the above-mentioned problem, an object of the present invention is to reduce the manufacturing cost of a multi-stage pulley by preventing the groove forming roller from being damaged.

The present invention, in order to achieve the above-mentioned objects, uses the following technical means.

In a first invention, a plurality of groove portions (101) are formed on an outer peripheral wall (103) of a pulley body (102) generally in the form of a cup and a damping portion (104) having a smaller rigidity than the groove portions (101) is formed between the groove portions (101).

With this structure, an effect that the stress produced due to the plastic deformation upon forming the groove portions (101) is absorbed by the damping portion (104) if the groove portions (101) are formed while the damping portion (104) is pressed, can be obtained.

Note that the damping portion (104) is preferably made of an annular groove recessed toward the inner side of the pulley body (102).

According to a second invention, the production method is characterized by comprising an annular groove forming step, in which an annular groove (104) recessed toward the inner side of a workpiece (W2) generally in the form of a cup is formed between the portions of the outer peripheral wall of the workpiece W2 corresponding to the groove portions (101), and a groove forming step, in which the groove portions (101) are formed on the outer peripheral wall of the workpiece (W2), with the annular groove (104) being pressed.

With this structure, firstly, the annular groove (104) functions as a damping portion having a smaller rigidity than the groove portions (101) and hence, the stress produced due to the plastic deformation during the formation of the groove portions (101) can be absorbed by the annular groove (104).

Therefore, no excessive shearing stress acts on the front ends of the groove forming rollers (206 and 207) in the groove forming process, and thus, not only can the groove forming rollers (206 and 207) be prevented from being damaged, but also no unwanted plastic deformation of the groove portions (101) takes place, leading to an increased dimensional accuracy of the multi-stage pulley (100).

Secondly, since the groove portions (101) are formed while pressing the annular groove (104), it can be ensured in the present invention that no unwanted plastic deformation of the groove portions (101) occurs.

As stated above, according to the present invention, is since the yield of the multi-stage pulley can be improved without increasing the equipment investment for the groove forming rollers (206 and 207), the manufacturing cost of the multi-stage pulley (100) can be reduced.

The annular groove (104) is preferably pressed by the annular groove forming roller (204) which is adapted to form the annular groove (104).

The present invention may be more fully understood from the description of preferred embodiments of the invention set forth below, together with-the accompanying drawings.

BRIEF DESCRIPTION OF THE DRAWINGS

In the drawings:

FIGS. 9A and 9B are schematic views showing a difference, in a finished state of a multi-stage pulley, between the presence and absence of an annular groove, of which FIG. 9A represents an absence of an annular groove and FIG. 9B represents a presence of an annular groove.

DESCRIPTION OF PREFERRED EMBODIMENTS

Figure 1:
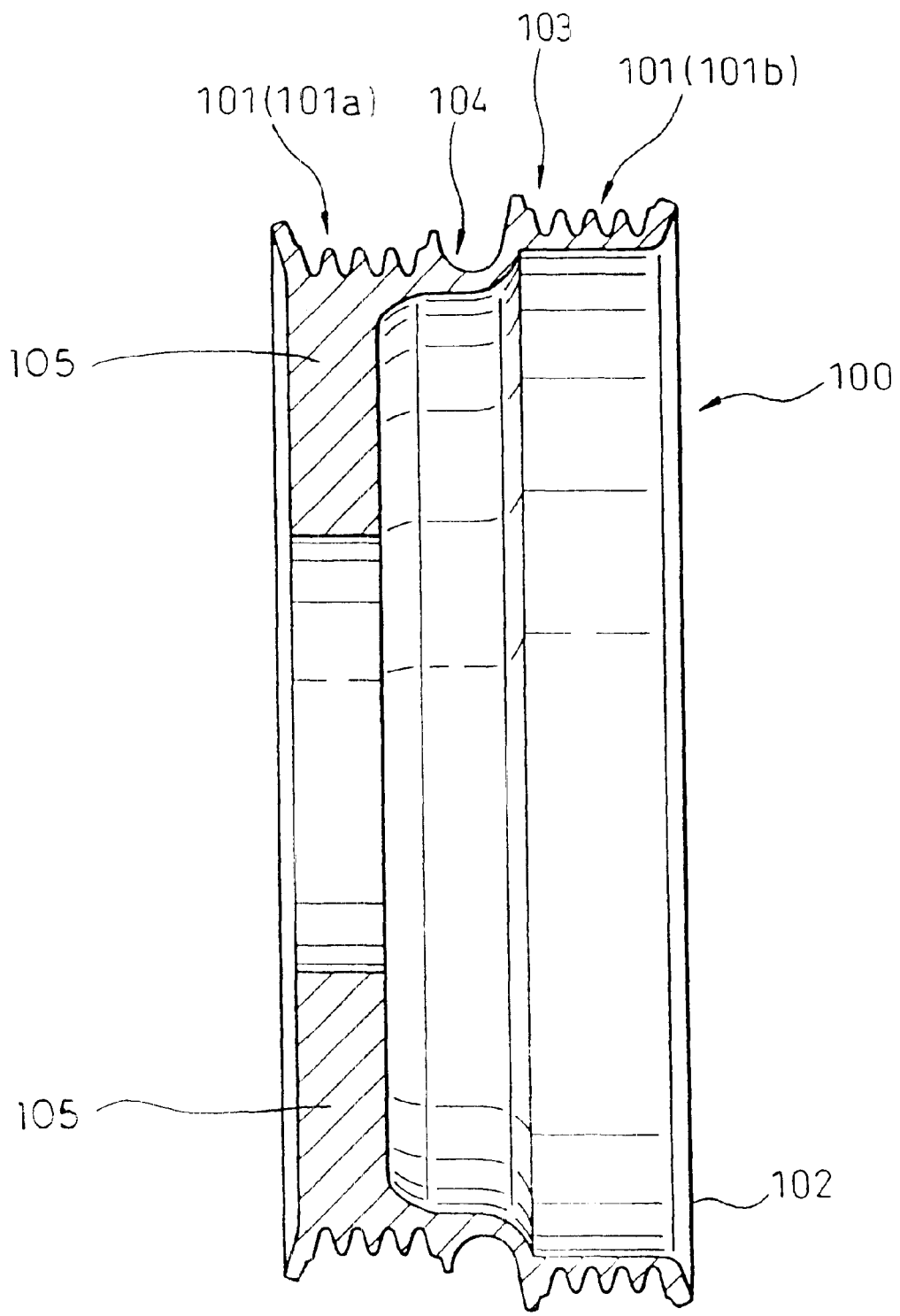
FIG. 1 is a sectional view of a multi-stage pulley according to the present invention.

FIG. 1 is a sectional view of a multi-stage pulley 100, to be manufactured by the method according to an embodiment of the present invention. The multi-stage pulley 100 is formed with two groove portions 101 integral therewith, around which driving belts (not shown) are wound. The groove portions 101 are formed on an outer peripheral wall (rim portion) 103 of a pulley body 102 generally in the form of a cup. An annular groove (damping portion) 104 recessed toward the inner side of the pulley body 102 is formed between the groove portions 101 so as to exhibit a rigidity smaller than the groove portions 101. Note that the thickness of the annular groove (damping portion) 104 is larger than a predetermined value.

Pulley 100 also includes a web 105, which extends radially relative to the axis of the pulley 100 and provides an annular wall. The web 105 is biased toward one side of the pulley. That is, as seen in FIG. 1, the web 105 extends radially to and is directly connected to the outer peripheral portion of the pulley 100 adjacent groove portion 101a. Thus, the annular groove 104 is spaced axially, along the axis of the pulley 100, from the web 105, since the web 105, as illustrated in FIG. 1, does not extend to the limits of or beyond the groove portion 101a.

The method for producing a multi-stage pulley 100 will be explained in the order of steps.

Figure 2:
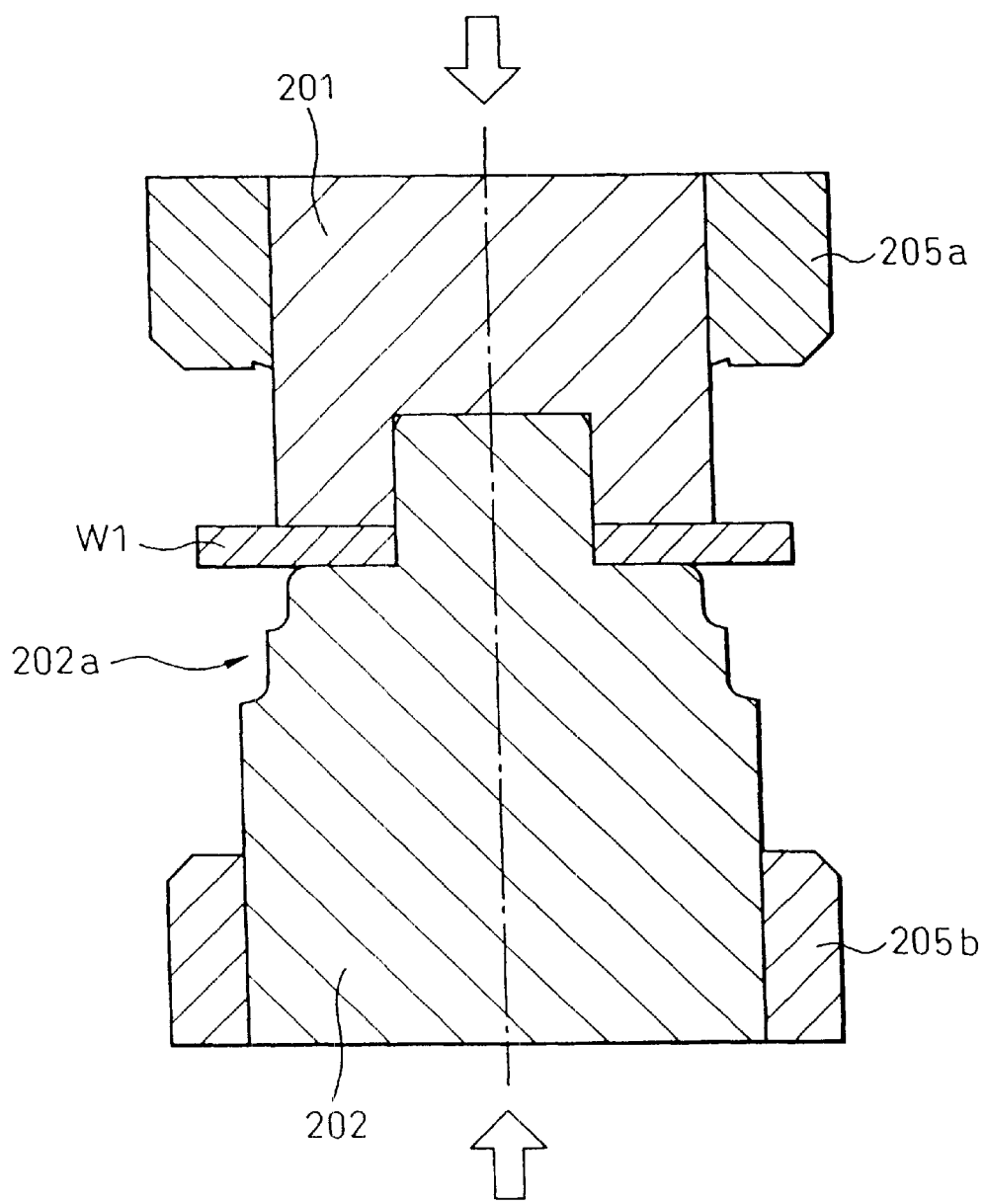
FIG. 2 is a schematic view showing a chucking operation.

In the first step, as shown in FIG. 2, a disc-shape blank W1 for the multi-stage pulley is held by pressing first and second dies 201 and 202 thereagainst from opposite directions of the multi-stage pulley blank W1 (chucking step).

Note that a stepped portion 202a, corresponding to the shape of the inner peripheral surface of the rim portion 103 of the multi-stage pulley 100 when the latter is finished, is formed on the outer peripheral surface of the second die 202.

Figure 3:
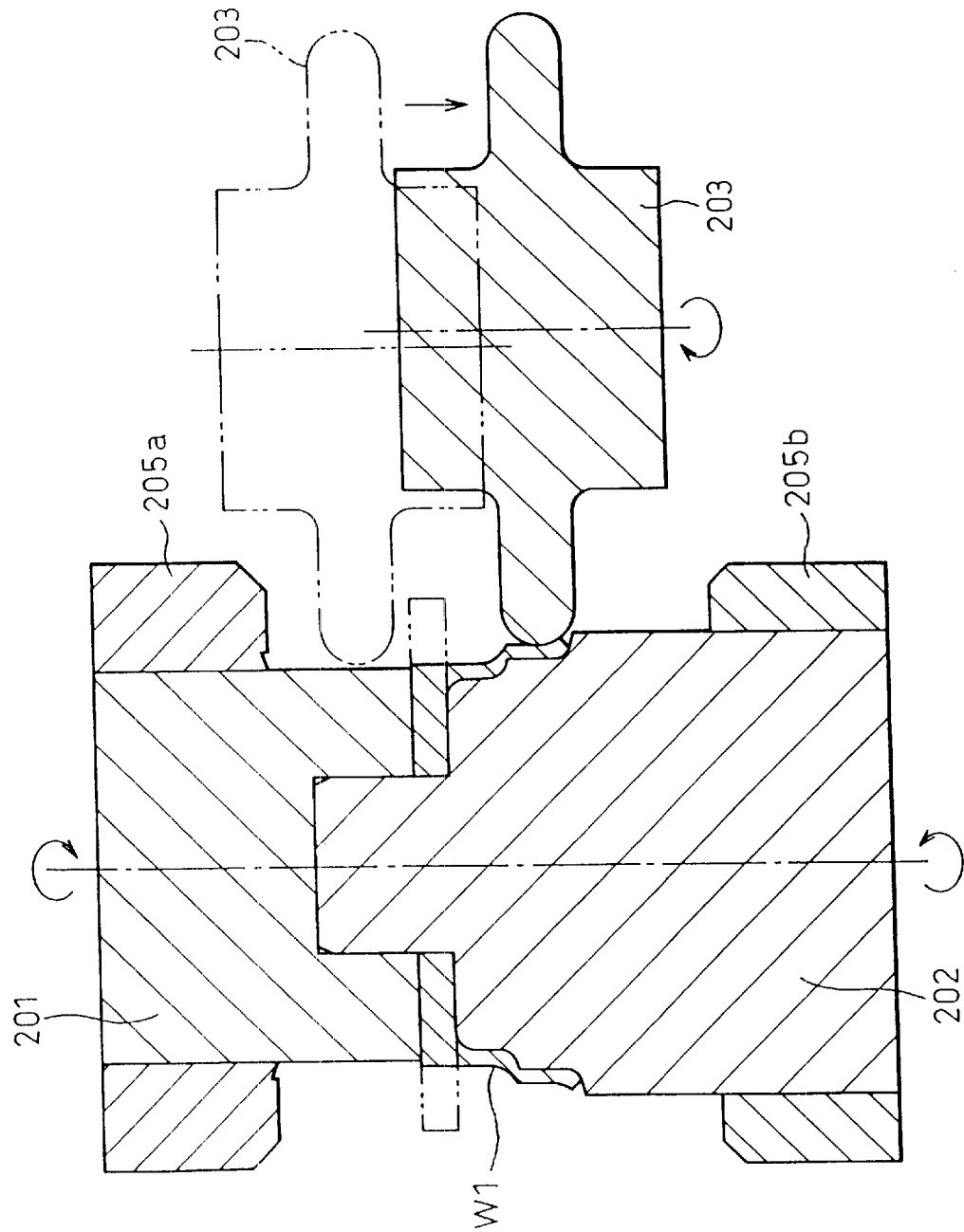
FIG. 3 is a schematic view showing a spinning operation.
Figure 4:
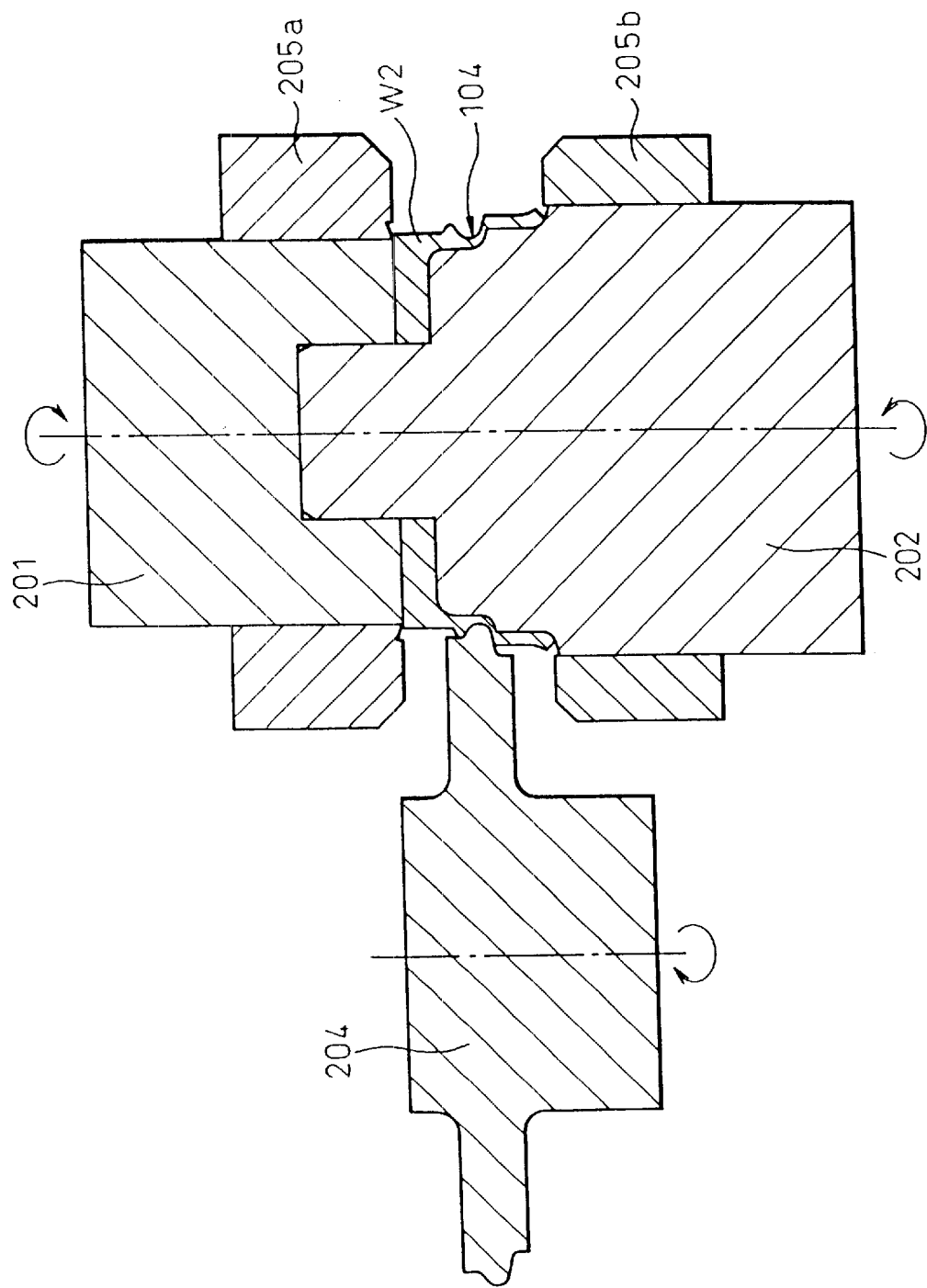
FIG. 4 is a schematic view showing an annular groove forming operation.

After that, as shown in FIG. 3, a spinning roller 203, rotating with the dies 201 and 202 and the multi-stage pulley blank W1, is moved in a direction toward the second die 202 from the first die 201 so that the portion of the blank W1 that is pressed by the dies 201 and 202 defines a bottom of a cup. Consequently, the blank W1 is spun into a cup shape along the stepped portion 202a (spinning step).

Thereafter, the annular groove 104 is formed by depressing the portion of the outer peripheral wall of the workpiece W2 thus formed generally in a cup shape in the spinning step that is located between the groove portions 101 by the annular groove forming roller 204 toward the inner side of the workpiece W2 (annular groove forming step).

In the annular groove forming step, workpiece holding rings 205a and 205b are moved towards the workpiece W2 to prevent the occurrence of an unnecessary plastic deformation of the workpiece W2 in the axial direction of the multi-stage pulley 100 (dies 201 and 202) during the following groove forming operation.

Figure 5:
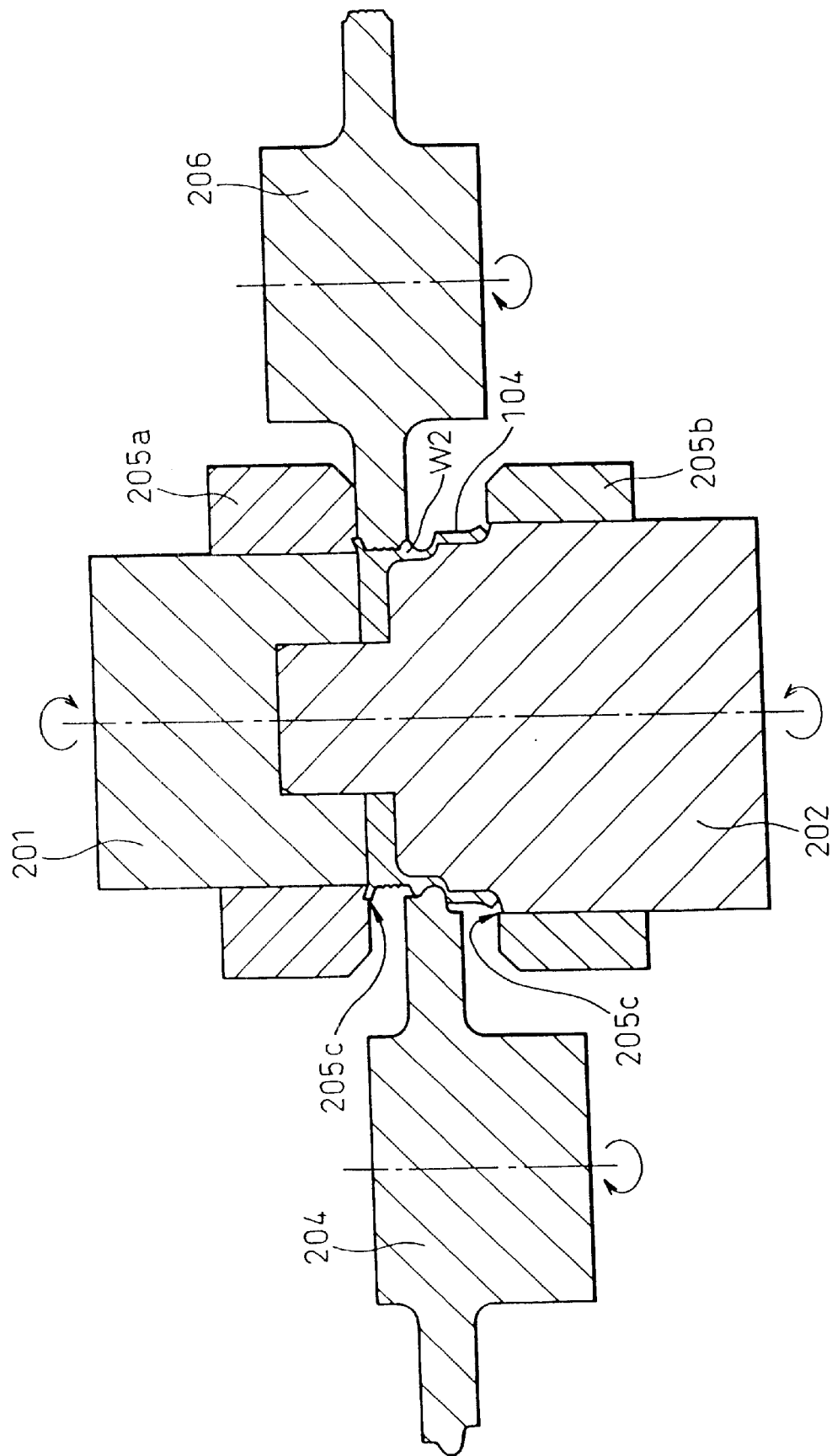
FIG. 5 is a schematic view showing a first groove forming operation.
Figure 6:
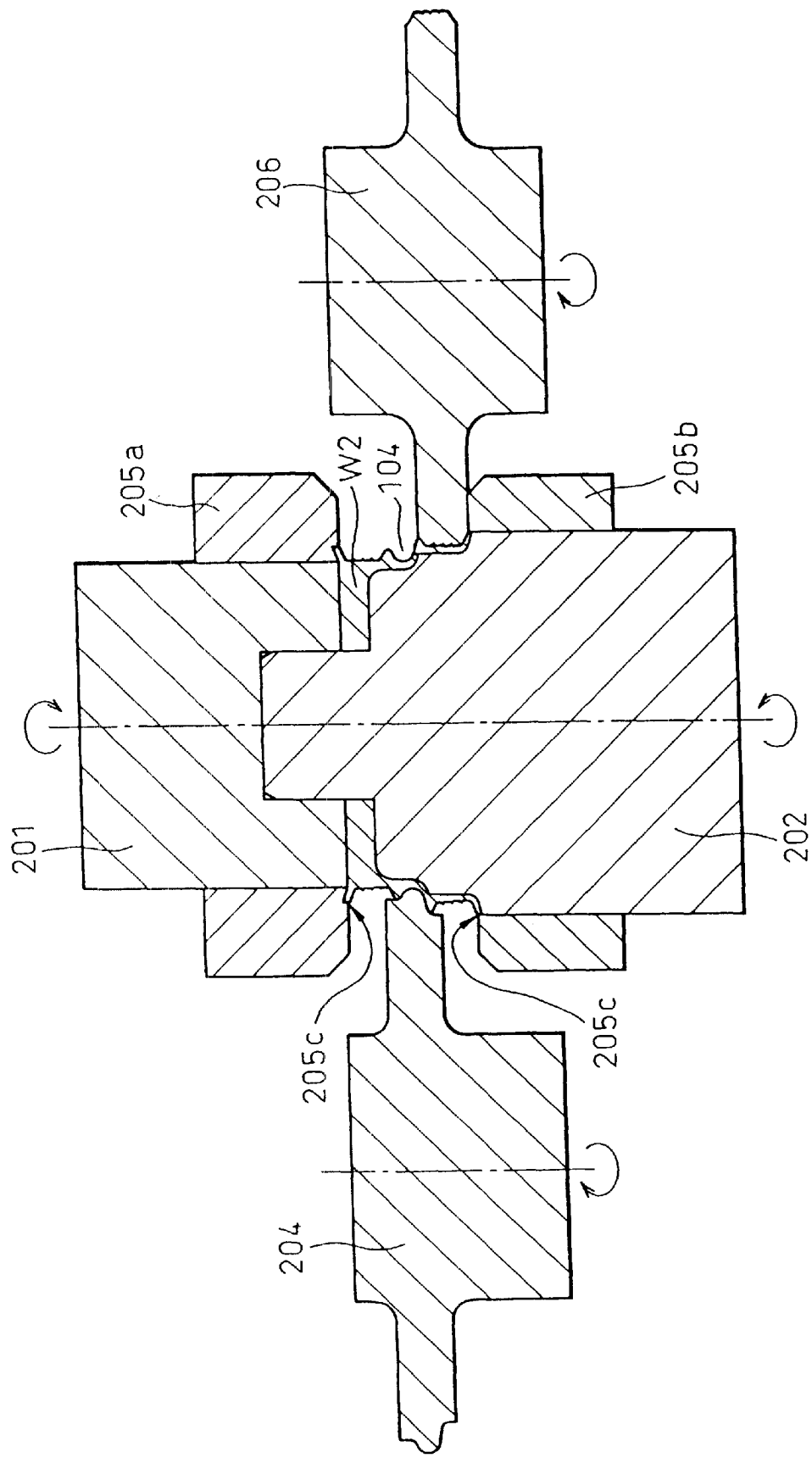
FIG. 6 is a schematic view showing a first groove forming operation.

As shown in FIGS. 5 and 6, two groove portions 101 are successively formed on the outer peripheral wall of the workpiece W2 by an auxiliary groove forming roller 206, while the annular groove forming roller 204 is inserted and pressed (first groove forming step).

Next, similarly to the first groove forming step (see FIGS. 7 and 8), two groove portions 101 are successively finished on the outer peripheral wall of the workpiece W2 by a finished groove forming roller 207, with the annular groove 104 being pressed by the annular groove forming roller 204 (second groove forming step).

The features of the illustrated embodiment of the present invention will be discussed below.

According to a multi-stage pulley producing method of the present invention, since the groove portions 101 are formed after forming the annular groove 104 between the portions corresponding to the groove portions 101, the stress produced due to the plastic deformation during the formation of the groove portions 101 can be absorbed by the annular groove 104 whose rigidity is smaller than that of the groove portions 101.

Figure 9A:
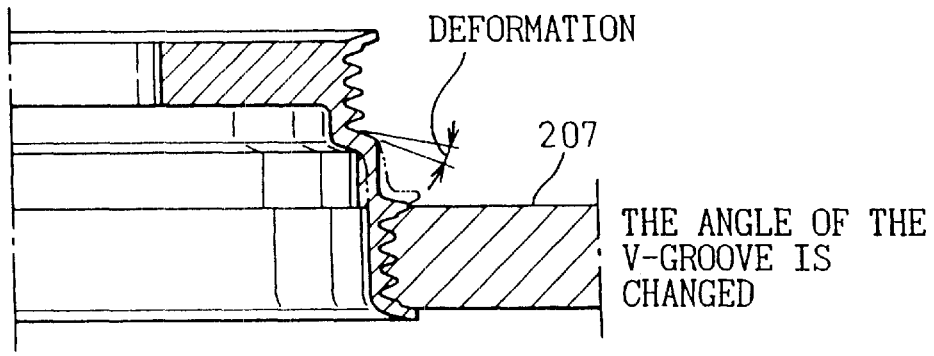
Figure 9B:
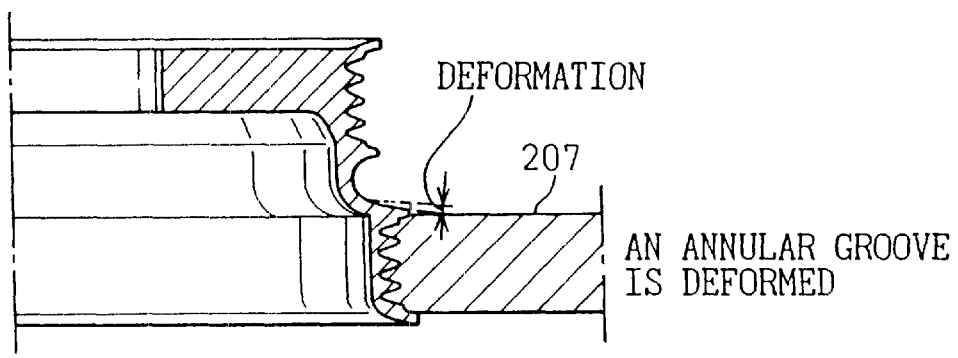

Therefore, no shear stress acts on the front ends of the groove forming rollers 206 and 207 in the first and second groove forming processes, and hence no damage to either of the groove forming rollers 206 and 207 occurs. In addition, an unwanted plastic deformation of the groove portions 101 can be avoided which results in an enhanced dimensional accuracy of the finished multi-stage pulley 100 (cf. FIG. 9).

Furthermore, in the embodiment, since the groove portions 101 are formed during pressing the annular groove 104 with the annular groove forming roller 204, an undesirable plastic deformation of the groove portions 101 can be avoided more certainly.

As stated above, according to the embodiment, the yield of the multi-stage pulley can be improved while restricting the cost on the groove forming rollers 206 and 207, and hence the manufacturing cost of the multi-stage pulley 100 can be reduced.

Also, since the two groove portions 101 are successively formed, no replacement of an undamaged groove forming roller is necessary, unlike the prior art discussed in "Description of the Related Art". Therefore, the cost of the groove forming rollers 206 and 207 can be further restricted and hence the manufacturing cost of the multi-stage pulley can be further curtailed.

Figure 7:
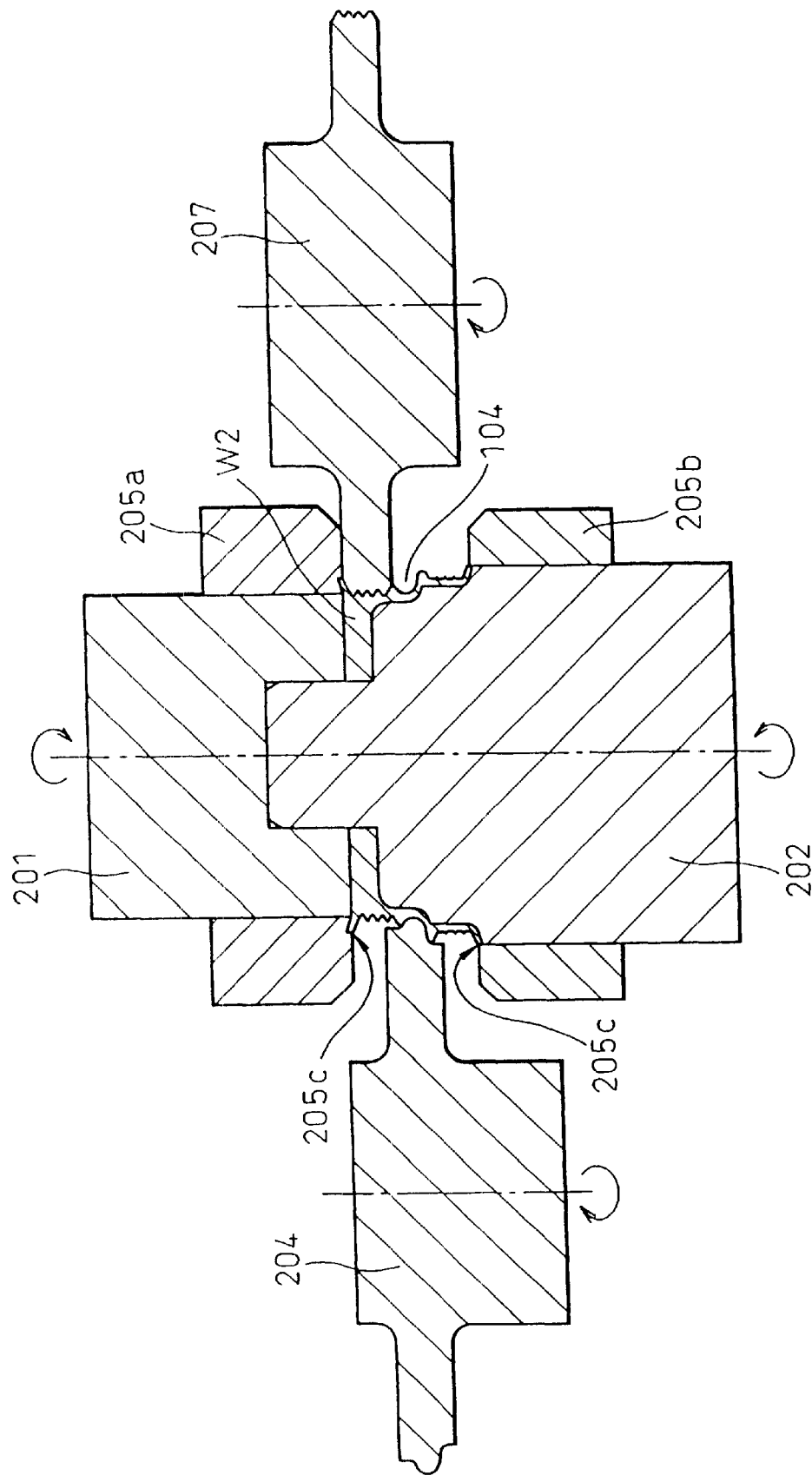
FIG. 7 is a schematic view showing a second groove forming operation.
Figure 8:
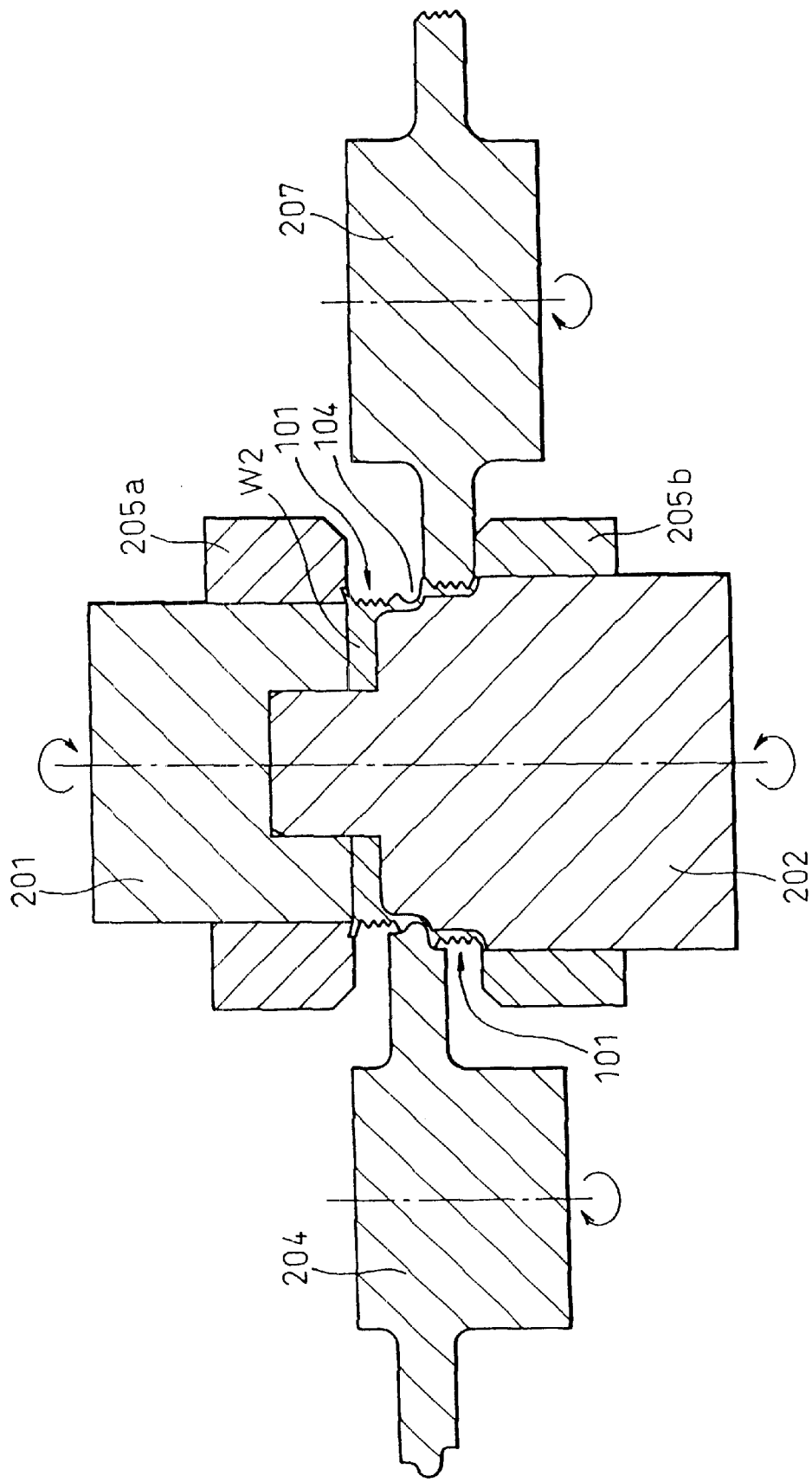
FIG. 8 is a schematic view showing a second groove forming operation.

Also, as shown in FIGS. 6 and 7, since no excessive plastic deformation of the outer peripheral wall of the workpiece W2 (rim portion 103) occurs owing to the engagement portions 205c formed on the workpiece holding rings 205a and 205b, the accuracy of the finished size of the multi-stage pulley 100 can be improved. Thus, the yield of the multi-stage pulley is improved and the manufacturing cost of the multi-stage pulley can be reduced.

Also, according to the embodiment, since the first and second dies 201 and 202 used in the chucking operation are used until the second groove forming process ends, it is not necessary to change the chucking dies for each step. Therefore, the capital investment on the dies can be reduced and the manufacturing cost of the multi-stage pulley can be decreased.

Figure 10:
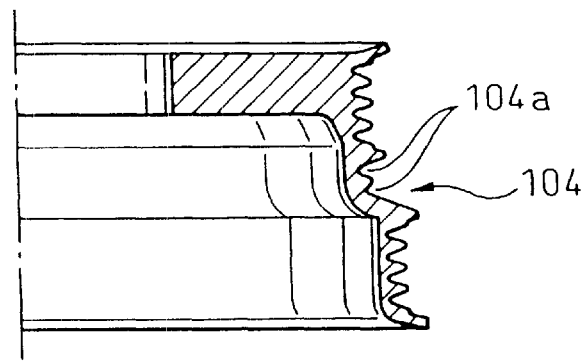
FIG. 10 is schematic view of a modified example of an annular groove.

The annular groove 104 which constitutes the damping portion is not limited to a groove having one trough portion, as in the above embodiment, and may be modified to have, for example, a plurality of trough portions 104a, as shown in FIG. 10.

Also, though, in the above embodiment, the annular groove 104 is pressed by the annular groove forming roller 204, the present invention is not limited to this method and it is possible to provide another pressing roller separate from the annular groove forming roller, in order to press the annular groove 104.

Figure 11:
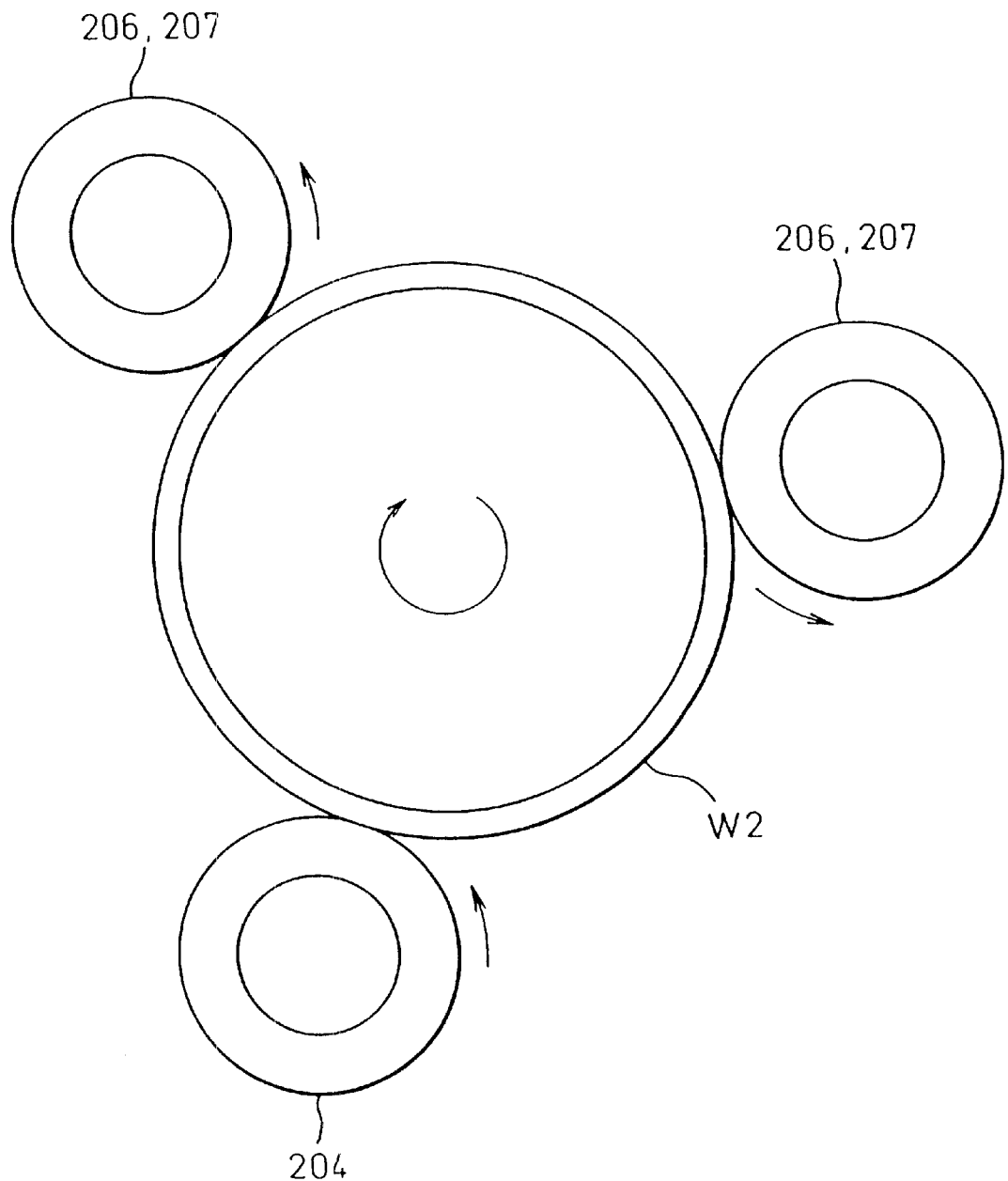
FIG. 11 is a schematic view showing a method for producing a multi-stage pulley according to another embodiment of the present invention.

Also, though, in the above embodiment, the groove portions 101 are successively formed one by one successively by pressing the groove forming rollers 206 and 207 against the workpiece W2 in the same direction, the present invention is not limited thereto and, as shown in FIG. 11, it is possible to press the groove forming rollers 206 and 207 against the workpiece W2 at different portions of the workpiece spaced in the circumferential direction when the groove portion 101a (FIG. 1) is formed and the groove portion 101b (FIG. 1) is formed. In this case, the two groove portions 101 101a and 10b) may be formed at one time.

Though, in the above embodiment, the workpiece W2 is formed into a generally cup shape by the spinning operation, the present invention is not limited thereto. The workpiece W2 can be formed of a plate or pipe blank into a generally cup shape by pressing.

What is claimed is:

1. A method for producing a multi-stage pulley having a plurality of groove portions around which driving belts can be wound, in which said groove portions are formed integrally comprising:

an annular groove forming step, in which an annular groove, which has a curved portion, recessed toward the inner side of a workpiece generally in the form of a cup is formed on the outer peripheral portion of the workpiece between the portions thereof corresponding to said groove portions by a first groove forming roller contacting only the annular groove; and a groove forming step performed after the annular groove forming step, in which each of said groove portions is formed on the outer peripheral wall of said workpiece by a second groove forming roller contacting only the respective groove portion, with said annular groove being pressed.

2. A method for producing a multi-stage pulley as defined in claim 1, in which said annular groove is pressed by said first groove forming roller, which is an annular groove forming roller which is adapted to form said annular groove.

3. A method according to claim 1, wherein the groove forming step includes forming each of the groove portions while the second groove forming roller is positioned on the workpiece at a first position along the circumference of the workpiece while the annular groove is pressed by the first groove forming roller at a second position along the circumference of the workpiece that is circumferentially spaced from the first position.

4. A method according to claim 3, wherein the groove forming step includes a third groove forming roller forming one of the groove portions while the second groove forming roller forms the other of the groove portions.

5. A method for producing a multi-stage pulley having a plurality of groove portions around which driving belts can be wound, in which the groove portions are formed integrally comprising:

an annular groove forming step, in which an annular groove, which has a curved portion, recessed toward the inner side of a workpiece generally in the form of a cup is formed on the outer peripheral portion of the workpiece between the portions thereof corresponding to the groove portions by a first groove forming roller, the annular groove being spaced axially, along the axis of the workpiece, from a web extending radially relative to the axis, the web extending to and being directly connected to the outer peripheral portion of the workpiece; and a groove forming step performed after the annular groove forming step, in which each of the groove portions is formed on the outer peripheral wall of the workpiece by a second groove forming roller, with the annular groove being pressed.

* * * * *